US012340743B2

(12) United States Patent
Yuan et al.

(10) Patent No.: US 12,340,743 B2
(45) Date of Patent: Jun. 24, 2025

(54) SIGNAL SELECTION CIRCUIT AND METHOD OF DISPLAY PANEL, AND DISPLAY DEVICE

(71) Applicants: Hefei BOE Joint Technology Co., Ltd., Anhui (CN); BOE TECHNOLOGY GROUP CO., LTD., Beijing (CN)

(72) Inventors: Zhidong Yuan, Beijing (CN); Cheng Xu, Beijing (CN); Dacheng Zhang, Beijing (CN); Can Yuan, Beijing (CN); Xiuting Liu, Beijing (CN); Yongqian Li, Beijing (CN)

(73) Assignees: Hefei BOE Joint Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/033,589

(22) PCT Filed: Jun. 29, 2022

(86) PCT No.: PCT/CN2022/102168
§ 371 (c)(1),
(2) Date: Apr. 25, 2023

(87) PCT Pub. No.: WO2024/000218
PCT Pub. Date: Jan. 4, 2024

(65) Prior Publication Data
US 2024/0386845 A1 Nov. 21, 2024

(51) Int. Cl.
*G09G 3/3233* (2016.01)

(52) U.S. Cl.
CPC ... *G09G 3/3233* (2013.01); *G09G 2300/0814* (2013.01); *G09G 2300/0819* (2013.01); *G09G 2300/0852* (2013.01); *G09G 2310/08* (2013.01)

(58) Field of Classification Search
CPC .......... G09G 3/20; G09G 3/3233; G09G 3/36; G09G 3/3677; G09G 2300/0814; G09G 2300/0819; G09G 2300/0852; G09G 2310/08
See application file for complete search history.

(56) References Cited

U.S. PATENT DOCUMENTS

2019/0088184 A1* 3/2019 Morein ............... G06F 3/04166

* cited by examiner

*Primary Examiner* — Stacy Khoo
(74) *Attorney, Agent, or Firm* — HOUTTEMAN LAW LLC

(57) ABSTRACT

The present disclosure provides a signal selection circuit and a signal selection method of a display panel, and a display device. The display panel has N regions and includes pixel driving circuits and M gate driving circuits for providing M gate driving signals to the pixel driving circuits; each gate driving circuit includes N gate driving sub-circuits, each of which is configured to provide one gate driving signal to the pixel driving circuits in one region; M≥2, N≥2, and M and N are integers; the signal selection circuit includes: M frame start signal lines, each of which is configured to provide a frame start signal for one gate driving circuit; and a selection sub-circuit configured to output frame start signals written by the frame start signal lines to the gate driving sub-circuits corresponding to the regions of the display panel according to a preset sequence.

11 Claims, 10 Drawing Sheets

SIGNAL SELECTION CIRCUIT AND METHOD OF DISPLAY PANEL, AND DISPLAY DEVICE

TECHNICAL FIELD

The present disclosure relates to the field of display technology, and particularly relates to a signal selection circuit of a display panel, a signal selection method of a display panel, and a display device.

BACKGROUND

The current mature technologies in the display field include those related to liquid crystal displays (LCD) and active matrix organic light emitting diode (OLED) displays. In a display system, an OLED product generally excites a spectrum of various wavelengths by direct combinations between electrons and holes, thereby displaying a pattern. Any display device formed by the OLED technology has a fast response speed and can maximize a contrast ratio, and thus an OLED display device is expected to become a next-generation display mainstream product.

In general, the OLED display device includes: a display panel, a gate driving device, a data driver and a time sequence controller. The display panel includes: data lines, gate lines, and pixels controlled through the data lines and the gate lines. Generally, during a gate driving signal being supplied to any gate line, a certain row of pixels are supplied with data voltages through the data lines. The pixels emit light with different brightness according to magnitudes of the data voltages. The gate driving device supplies the gate driving signal to the gate line, and the gate driving device includes a separate gate driving integrated circuit or a panel gate driving circuit.

Since the single gate driving integrated circuit is not favorable for a narrow bezel and a low cost, the panel gate driving circuit is more and more concerned at present. The conventional panel gate driving circuit determines a method for driving the circuit according to processes, such as oxide, low temperature poly-silicon (LTPS), etc., but the principle is substantially the same.

For driving N regions one by one through a gate driven on array (GOA), each region needs a start signal, and N start signals are required in total. In this case, in a case where N is relatively large, the number of the start signals is great, which affects key indexes such as a PLG (Panel Line of Gate) design and interface pins of a chip on film (COF).

SUMMARY

The present disclosure is directed to at least one technical problem in the existing art, and provides a signal selection circuit of a display panel, a signal selection method of a display panel, and a display device.

In a first aspect, the present disclosure provides a signal selection circuit of a display panel, the display panel is divided into N regions, and the display panel includes a plurality of pixel driving circuits and M gate driving circuits for providing M gate driving signals to the pixel driving circuits; each of the gate driving circuits includes N gate driving sub-circuits, and each gate driving sub-circuit is configured to provide one of the gate driving signals for the pixel driving circuits in one region; M≥2, N≥2, and M and N are integers; the signal selection circuit includes: M frame start signal lines, each frame start signal line being configured to provide a frame start signal for one of the gate driving circuits; and a selection sub-circuit configured to output the frame start signals written by the frame start signal lines to the gate driving sub-circuits corresponding to the regions of the display panel according to a preset sequence.

In some examples, the selection sub-circuit includes: a control component and N selection components; the control component is configured to select one of the N selection components to operate; the N selection components are arranged in one-to-one correspondence with the N regions of the display panel, and each selection component is configured to provide frame start signals respectively for the M gate driving circuits corresponding to one region under a control of the control component.

In some examples, the control component further includes P first logic devices and N second logic devices; each selection component includes M third logic devices; the first logic devices are NOT gate, and the second logic devices and the third logic devices are AND gates; $P=[\log_2 N]+1$; an input terminal of each first logic device is connected with a corresponding selection control signal line, and each selection control signal line and an output terminal of each first logic device are connected with an input terminal of a corresponding one of the second logic devices, so that output terminals of the N second logic devices output selection control signals according to a preset sequence, to correspondingly control the selection components to operate; and each third logic device in each selection component is connected with the frame start signal line corresponding to the third logic device and an output terminal of the second logic device corresponding to the third logic device.

In some examples, the N second logic devices are AND gates, a number X of input bits of each AND gate is the same as a number P of selection control signal lines.

In some examples, the control component further includes P first logic devices and N second logic devices; each selection component includes M third logic devices; the first logic devices are NOT gates, the second logic devices are NAND gates, and the third logic devices are NOR gates; an input terminal of each first logic device is connected with a corresponding selection control signal line, and each selection control signal line and an output terminal of each first logic device are connected with an input terminal of a corresponding one of the second logic devices, so that output terminals of the N second logic devices output selection control signals according to a preset sequence, to correspondingly control the selection components to operate; and each third logic device in each selection component is connected with the frame start signal line corresponding to the third logic device and an output terminal of the second logic device corresponding to the third logic device.

In some examples, the N second logic devices are NAND gates, where a number X of input bits of each NAND gate is the same as a number P of selection control signal lines.

In some examples, M=4, N=4, and P=3, four regions of the display panel are sequentially arranged from a first region to a fourth region, and correspond to four selection components one to one, the four selection components include a first selection component, a second selection component, a third selection component and a fourth selection component; the number of the selection control signal lines is 3, and the selection control signal lines include a first selection control signal line, a second selection control signal line and a third selection control signal line; four frame start signal lines include a first frame start signal line, a second frame start signal line, a third frame start signal line and a fourth frame start signal line; three first logic devices in the control component are all NOT gates and include a first NOT gate, a second NOT gate and a third NOT gate; four second logic devices in the control component are all AND gates, each having three input terminals, including a first AND gate, a second AND gate, a third AND gate and a fourth AND gate, each selection component includes four third logic devices, the third logic devices are all AND gates, the four third logic devices in the first selection component include a fifth AND gate, a sixth AND gate, a seventh AND gate and an eighth AND gate; level signals are input into the frame start signal lines and the selection control signal lines according to an implementation sequence, where a first input terminal of the first AND gate is connected with an output terminal of the first NOT gate, a second input terminal of the first AND gate is connected with an output terminal of the second NOT gate, a third input terminal of the first AND gate is connected with the third selection control signal line, an output terminal of the first AND gate outputs a high level signal, and the first frame start signal line outputs a high level signal; a first input terminal of the fifth AND gate is connected with the first frame start signal line, a second input terminal of the fifth AND gate is connected with the output terminal of the first AND gate, the output terminal of the fifth AND gate outputs a high level signal, the rest can be deduced from above, and the frame start signals are respectively provided for the four regions of the display panel.

In a second aspect, the present disclosure further provides a signal selection method of a display panel, applied to the signal selection circuit of the display panel; including: determining a number N of regions of the display panel and a number M of frame start signal lines; inputting M frame start signals into the M frame start signal lines, and outputting M×N frame start signals according to a preset sequence through a selection sub-circuit, so as to realize displaying of the display panel region by region.

In a third aspect, the present disclosure further provides a display device including the signal selection circuit of the display panel described above.

In some examples, the display device includes gate lines for supplying gate driving signals to the pixel driving circuits, opposite ends of each of the gate lines are connected with the gate driving circuits respectively, and each of the gate driving circuits is electrically connected to the signal selection circuit of the display panel.

DETAILED DESCRIPTION

In order to make technical solutions of the present disclosure better understood, the present disclosure will be described in further detail with reference to the accompanying drawings and implementations.

Unless defined otherwise, technical or scientific terms used herein shall have the ordinary meaning as understood by one of ordinary skill in the art to which the present disclosure belongs. The use of "first," "second," and the like in the present disclosure is not intended to indicate any order, quantity, or importance, but rather is used to distinguish one element from another. Also, the use of the terms "a," "an," or "the" and similar referents does not denote a limitation of quantity, but rather denotes the presence of at least one. The word "comprising/including" or "made of/consist of", and the like, means that the element or item preceding the word contains the element or item listed after the word and its equivalent, but does not exclude other elements or items. The terms "connected" or "coupled" and the like are not restricted to physical or mechanical connections, but may include electrical connections, whether direct or indirect. Terms "upper/on/above", "lower/below/under", "left", "right", and the like are used only to indicate relative positional relationships, and when an absolute position of the object being described is changed, the relative positional relationships may be changed accordingly.

Figure 1:
FIG. 1 is a schematic diagram of a display panel.

FIG. 1 is a schematic diagram of a display panel, as shown in FIG. 1, the display panel is exemplarily divided into a display region and a peripheral region surrounding the display region, the display panel includes a plurality of pixels located in the display region and arranged in an array, and a gate driving circuit located in the peripheral region. Each pixel only includes a pixel driving circuit and a light emitting device connected to the pixel driving circuit. The gate driving circuit includes a plurality of shift registers (i.e., gate driving sub-circuits) cascaded, each shift register provides a gate driving signal to pixel driving circuits in a same row.

Figure 2:
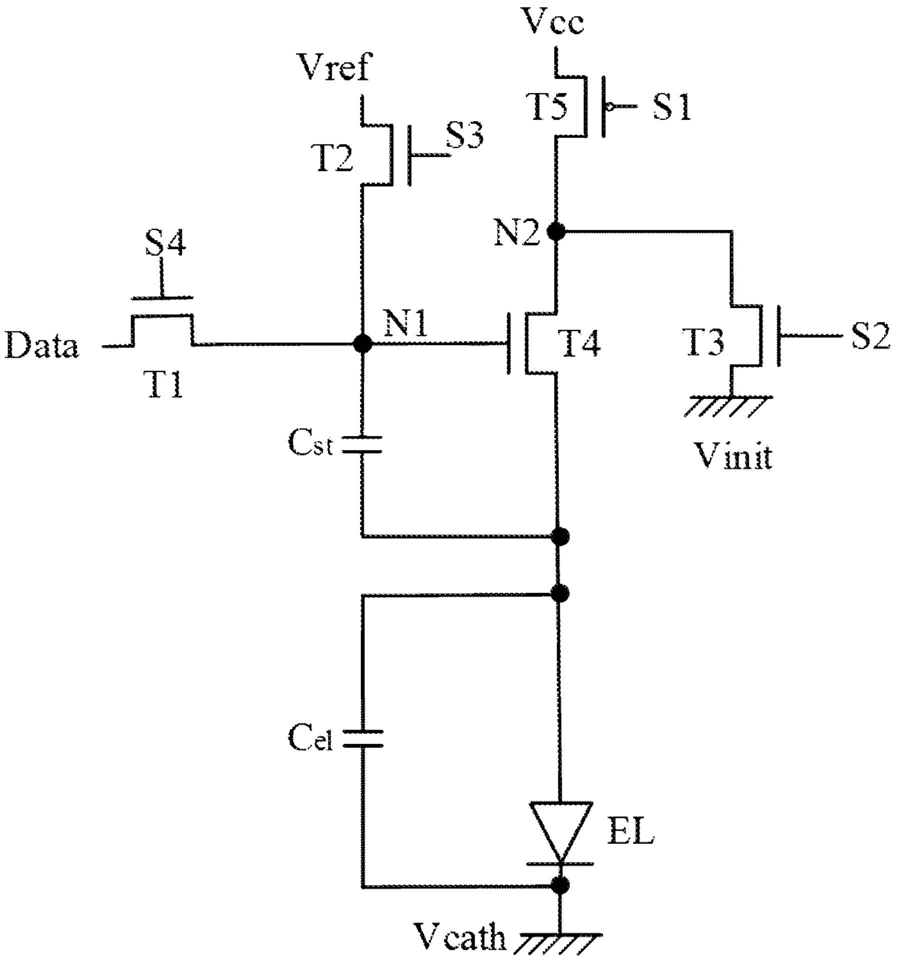
FIG. 2 is a pixel driving circuit.

Specifically, FIG. 2 shows a pixel driving circuit, and as shown in FIG. 2, the pixel driving circuit exemplarily includes a switch transistor T1, a first reset transistor T2, a second reset transistor T3, a driving transistor T4, a light emission control transistor T5, first and second storage capacitors $C_{st}$ and $C_{el}$, a data line Data, a reference signal line Vref, an initialization signal line Vinit, a first power signal line Vcc, and a second power signal line Vcath. A source of the switch transistor T1 is electrically connected to the data line Data, a drain of the switch transistor T1 is electrically connected to a first electrode $C_{st1}$ of the first storage capacitor $C_{st}$, a drain of the first reset transistor T2 and a gate of the driving transistor T4, respectively, and a gate of the switch transistor T1 is electrically connected to a fourth control line S4. A source of the first reset transistor T2 is electrically connected to the reference signal line Vref, the drain of the first reset transistor T2 is electrically connected to the first electrode $C_{st1}$ of the first storage capacitor $C_{st}$, the drain of the switch transistor T1, and the gate of the driving transistor T4, respectively, and a gate of the first reset transistor T2 is electrically connected to a third control line S3. A connection node between the drain of the first reset transistor T2, the first electrode $C_{st1}$ of the first storage capacitor $C_{st}$, the drain of the switch transistor T1, and the gate of the driving transistor T4 is N1. A source of the second reset transistor T3 is electrically connected to the initialization signal line Vinit, and a drain of the second reset transistor T3 is electrically connected to a drain of the light emission control transistor T5 and a source of the driving transistor T4, respectively. A second electrode $C_{st2}$ of the first storage capacitor $C_{st}$, a first electrode $C_{el1}$ of the second storage capacitor $C_{el}$, a first electrode (i.e., anode) of a light emitting device EL, and a drain of the driving transistor T4 are electrically connected, and a gate of the second reset transistor T3 is electrically connected to a second control line S2. A connection node between the drain of the second reset transistor T3, the source of the driving transistor T4, and the drain of the light emission control transistor T5 is N2. The source of the driving transistor T4 is electrically connected to the drain of the light emission control transistor T5, the drain of the driving transistor T4 is electrically connected to the first electrode (i.e., anode) of the light emitting device EL, the second electrode $C_{st2}$ of the first storage capacitor $C_{st}$, the first electrode $C_{el1}$ of the second storage capacitor $C_{el}$, and the drain of the second reset transistor T3, respectively, and the gate of the driving transistor T4 is electrically connected to the drain of the switch transistor T1, the first electrode $C_{st1}$ of the first storage capacitor $C_{st}$, and the drain of the first reset transistor T2, respectively. A source of the light emission control transistor T5 is electrically connected to the first power signal line Vcc, the drain of the light emission control transistor T5 is electrically connected to the source of the driving transistor T4, and a gate of the light emission control transistor T5 is electrically connected to a first control line S1. The first electrode (i.e., anode) of the light emitting device EL is electrically connected to the drain of the driving transistor T4, the second electrode $C_{st2}$ of the first storage capacitor $C_{st2}$ and the first electrode $C_{el1}$ of the second storage capacitor $C_{el}$, respectively, and a second electrode (i.e., cathode) of the light emitting device EL is electrically connected to a second electrode $C_{el2}$ of the second storage capacitor $C_{el}$ and the second power signal line Vcath, respectively. As seen from FIG. 2, four gate driving lines including the first control line S1, the second control line S2, the third control line S3 and the fourth control line S4 are configured for each pixel driving circuit to supply a light emission control signal to the light emission control transistor T5, an initialization signal to the second reset transistor T3, a reset signal to the first reset transistor T2 and a switch control signal to the switch transistor T1, respectively. For convenience of wiring, for pixel driving circuits in a same row, gates of light emission control transistors T5 are connected to the same first control line S1, gates of first reset transistors T2 are connected to the same third control line S3, gates of second reset transistors T3 are connected to the same second control line S2, gates of switch transistors T1 are connected to the same fourth control line S4, and since the gate driving sub-circuit of each gate driving circuit provides the gate driving signal to one control signal line, four gate driving circuits are desired by the display panel shown in FIG. 7*a* to respectively provide the gate driving signal to each control line, so as to provide the gate driving signal to the pixel driving circuits in the same row. For any gate driving circuit, except for the gate driving sub-circuit at a first stage, a signal output terminal of the gate driving sub-circuit at a current stage is connected with a signal input terminal of the gate driving sub-circuit at a next stage, so that the gate driving sub-circuits at multiple stages are cascaded, a signal input terminal of the gate driving sub-circuit at the first stage is connected with a frame start signal line, and the frame start signal line is connected with a printed circuit board, so that the frame start signal provided by the printed circuit board is input into the signal input terminal of the gate driving sub-circuit at the first stage through the frame start signal line.

It found that, as a size of the display panel being continuously increased, the display panel being driven region by region can be controlled more flexibly. In such case, four gate driving circuits are desired by each region of the display panel, and in response to that the display panel is divided into four regions, 16 gate driving circuits are desired, that is, 16 frame start signal lines are desired, and accordingly, the number of ports of the printed circuit board is desired to be corresponding to the number of the frame start signal lines, which greatly increases the cost.

Based on the above technical problem, following technical solutions are provided in the present disclosure, and the present disclosure provides a signal selection circuit of a display panel, which can be applied to a pixel driving circuit in the display panel in a case where the display panel is divided into N regions, so that the number of start signals is reduced, and thus the N regions can be controlled to be independently started by fewer signals, and has a great application value. M frame start signal lines are determined according to the number of gate driving signals to be desired by the pixel driving circuit, thereby each gate driving circuit is provided with the gate driving signal, M frame start signals of the M frame start signal lines are input into selection sub-circuits, and M×N frame start signals are output through the selection sub-circuits according to a preset sequence, so as to realize displaying of the display panel region by region.

The following describes a signal selection circuit of a display panel according to the present disclosure with reference to the accompanying drawings and implementations.

Figure 6:
FIG. 6 is a schematic diagram of a display panel according to the present disclosure.

The present disclosure provides a signal selection circuit of a display panel, which can make start signals more concise in a case where the display panel is to be driven region by region. FIG. 6 is a schematic diagram of a display panel according to the present disclosure, and as shown in FIG. 6, the display panel is divided into N regions, and the display panel includes a plurality of pixel driving circuits and M gate driving circuits for providing M gate driving signals to the pixel driving circuits; each gate driving circuit includes N gate driving sub-circuits, and each gate driving sub-circuit is configured to provide one gate driving signal for the pixel driving circuits in one region, where M≥2, N≥2, and M and N are integers. The signal selection circuit in the present disclosure includes: M frame start signal lines and a selection sub-circuit. Each of the M frame start signal lines is configured to provide a frame start signal for one gate drive circuit; the selection sub-circuit is configured to output frame start signals written by the frame start signal lines to the gate driving sub-circuits corresponding to the respective region of the display panel in a preset sequence.

Since the selection sub-circuit is incorporated in the signal selection circuit of the display panel in the present disclosure, the frame start signals input into the gate driving sub-circuits corresponding to the respective regions of the display panel can be selected, thereby realizing displaying of the display panel region by region; moreover, the number of signals is reduced through the selection sub-circuit, so that the number of signal access ports of the display panel is reduced, a narrow bezel design of the display panel is realized, and a lower manufacturing cost is achieved.

It should be noted that the selection sub-circuit is desired to output the frame start signals written by the frame start signal lines to the gate driving sub-circuits corresponding to the respective regions of the display panel according to the preset sequence, but the specific internal selection function thereof is not limited.

In some examples, the selection sub-circuit includes: a control component and N selection components; the control component is configured to select one of the N selection components to operate; the N selection components are arranged in one-to-one correspondence with the N regions of the display panel, and each selection component is configured to provide frame start signals respectively for the M gate driving circuits corresponding to one region of the display panel under a control of the control component. Since the control component can select one of the N selection components to operate, and the N selection components are in one-to-one correspondence with the N regions of the display panel, the displaying of each region of the display panel can be accurately controlled, so that a high-frequency frame may be locally inserted in displaying of part regions of the display panel, and intelligent displaying can be achieved.

Furthermore, the control component may further include P first logic devices and N second logic devices; each of the selection components may include M third logic devices; the first logic devices are NOT gates, and the second logic devices and the third logic devices are AND gates, where $P=[\log_2 N]+1$.

It should be noted that, since there is a case where no signal is written to all the regions of the display panel, that is, all logic levels are reset to zero, $P=[\log_2 N]+1$, $[\log_2 N]$ indicates an integer not greater than $\log_2 N$.

An input terminal of each first logic device is connected with a corresponding selection control signal line, so as to obtain an inverted signal of each selection control signal, and each selection control signal line and an output terminal of each first logic device are connected with an input terminal of the second logic device corresponding thereto, so that output terminals of the N second logic devices output selection control signals according to a preset sequence to control the corresponding selection components to operate. Each third logic device in each selection component is connected with the frame start signal line corresponding thereto and the output terminal of the second logic device corresponding thereto, so that displaying of the display panel region by region is realized.

Figure 12:
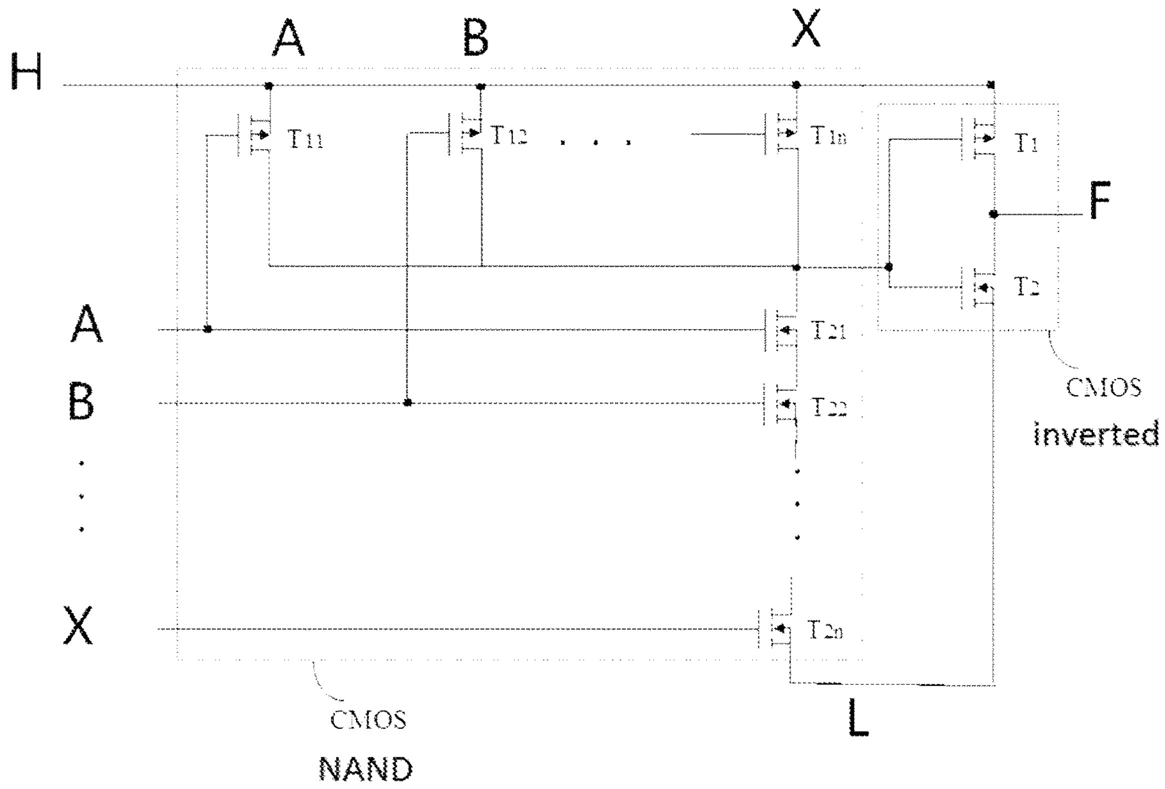
FIG. 12 is a circuit diagram of an X-bit AND gate.

The N second logic devices are AND gates, and the number X of input bits of each AND gate is the same as the number P of selection control signal lines, so that a logic AND of the selection control signals can be realized. The AND gate may be implemented by using a CMOS transistor, an NMOS transistor, a PMOS transistor, and a diode, FIG. 12 is a circuit diagram of an X-bit AND gate, and as shown in FIG. 12, the circuit of the AND gate in the present disclosure is a CMOS AND gate circuit. The CMOS AND gate circuit includes a CMOS NAND gate and a CMOS inverter, an NMOS transistor and a PMOS transistor are in pair in the circuit and are complementary in operating to form the CMOS AND gate circuit, if an X-bit input AND gate is desired, X pairs of CMOS transistors are desired, that is, the number of input bits may be changed by increasing or decreasing the CMOS transistors. An X-bit input CMOS AND gate circuit includes an X-bit input CMOS NAND gate circuit and an NOT gate (an inverter), the X-bit input NAND gate includes X N-channel enhancement type MOS transistors connected in series and X P-channel enhancement type MOS transistors connected in parallel, and the inverter includes an N-type transistor and a P-type transistor. An output of the X-bit input NAND gate is an input of the inverter, each input terminal of A, B . . . X is connected to a gate of an N-channel MOS transistor and a P-channel MOS transistor, and an output terminal F is an output terminal of the inverter. In response to that any one of input terminals A, B . . . X is at a low level, the NAND gate can enable the NMOS transistor connected with the NAND gate to be turned off, enable the PMOS transistor connected with the NAND gate to be turned on, and a high level is output, so that the input of the inverter is at a high level; in response to that the input of the inverter is at the high level, the NMOS transistor of the inverter is turned on, and the PMOS transistor is turned off, so that the output of the inverter, i.e., the output terminal F, outputs a low level. In response to that all of A, B . . . X are at a high level, X NMOS transistors connected in series in the NAND gate are all turned on, and X PMOS transistors connected in parallel are all turned off, a low level is output, then the PMOS transistor of the inverter is turned on, and the NMOS transistor of the inverter is turned off, the output terminal Q outputs a high level, and finally the function of the X-bit input AND gate is achieved.

In some examples, without changing the design of regions of the display panel in the present disclosure, the control component further includes P first logic devices and N second logic devices; each of the selection components includes M third logic devices; the first logic devices are NOT gates, the second logic devices are NAND gates, and the third logic devices are NOR gates.

The input terminal of each first logic device is connected with the corresponding selection control signal line, so as to obtain an inverted signal of each selection control signal, and each selection control signal line and the output terminal of each first logic device are connected with the input terminal of the corresponding second logic device, so that the output terminals of the N second logic devices output the selection control signals according to a preset sequence to control the corresponding selection components to operate.

Each third logic device in each selection component is connected with the corresponding frame start signal line and the output terminal of the corresponding second logic device, so that displaying of the display panel region by region is realized.

In such examples, the N second logic devices are changed from AND gates to NAND gates, and the third logic devices are changed from AND gates to NOR gates, but the change of the gate circuits does not affect implementation of the function of the signal selection circuit in the display panel of the present disclosure, where the number X of input bits of each NAND gate is the same as the number P of selection control signal lines.

It should be noted that, in such examples, referring to FIG. 12, compared with the AND gate, the NAND gate has no inverter including the PMOS transistor and the NMOS transistor, that is, the NAND gate in the CMOS gate circuit is easier to be implemented than the AND gate, thereby simplifying an internal basic circuit of the present disclosure, and further optimizing an architecture of the present disclosure.

In the field of display technology, the number of gate driving signals desired by the pixel driving circuit applied to the display panel may vary according to the function of the pixel driving circuit. FIG. 2 shows a pixel driving circuit, as shown in FIG. 2, the pixel driving circuit includes: a switch transistor T1, a first reset transistor T2, a second reset transistor T3, a driving transistor T4, a light emission control transistor T5, first and second storage capacitors $C_{st}$ and $C_{el}$, a data line Data, a reference signal line Vref, an initialization signal line Vinit, a first power signal line Vcc, and a second power signal line Vcath.

It should be noted that the transistors used in the pixel driving circuit of the present disclosure may be thin film transistors or field effect transistors or other devices with the same characteristics, and the transistors may be divided into N-type and P-type according to characteristics of the transistors, where if P-type transistors are used, a source and a drain of each transistor are conducted, i.e., the transistor is turned on, in response to that a low level signal is input to a gate of the transistor, and if N-type transistors are used, a source and a drain of each transistor are conducted, i.e., the transistor is turned on, in response to that a high level signal is input to a gate of the transistor. As shown in FIG. 2, in the pixel driving circuit, except that the light emission control transistor T5 is the P-type transistor, the other transistors are N-type transistors.

Specifically, a source of the switch transistor T1 is electrically connected to the data line Data, a drain of the switch transistor T1 is electrically connected to a first electrode $C_{st1}$ of the first storage capacitor $C_{st}$, a drain of the first reset transistor T2 and a gate of the driving transistor T4, and a gate of the switch transistor T1 is electrically connected to a fourth control line S4. Specifically, the switch transistor T1 is configured to be turned on in response to that an operating level is written in the fourth control line S4, transmit a data voltage signal written by the data line Data to the gate of the driving transistor T4, and store the data voltage signal through the first storage capacitor $C_{st}$.

A source of the first reset transistor T2 is electrically connected to the reference signal line Vref, the drain of the first reset transistor T2 is electrically connected to the first electrode $C_{st1}$ of the first storage capacitor $C_{st}$, the drain of the switch transistor T1, and the gate of the driving transistor T4, and a gate of the first reset transistor T2 is electrically connected to a third control line S3. A connection node between the drain of the first reset transistor T2, the first electrode $C_{st1}$ of the first storage capacitor $C_{st}$, the drain of the switch transistor T1, and the gate of the driving transistor T4 is N1. Specifically, the first reset transistor T2 is configured to be turned on in response to that an operating level is written in the third control line S3, and output a first reset signal written by the reference signal line Vref to the connection node N1.

A source of the second reset transistor T3 is electrically connected to an initialization signal line Vinit, and a drain of the second reset transistor T3 is electrically connected to a drain of the light emission control transistor T5 and a source of the driving transistor T4. A second electrode $C_{st2}$ of the first storage capacitor $C_{st}$, a first electrode $C_{el1}$ of the second storage capacitor $C_{el}$, a first electrode (i.e., anode) of a light emitting device EL, and a drain of the driving transistor T4 are electrically connected, and a gate of the second reset transistor T3 is electrically connected to a second control line S2. A connection node between the drain of the second reset transistor T3, the source of the driving transistor T4, and the drain of the light emission control transistor T5 is N2. Specifically, the second reset transistor T3 is configured to be turned on in response to that an operating level is written in the second control line S2, and transmit a second reset signal written by the initialization signal line Vinit to the connection node N2.

The source of the driving transistor T4 is electrically connected to the drain of the light emission control transistor T5, the drain of the driving transistor T4 is electrically connected to the first electrode (i.e., anode) of the light emitting device EL, the second electrode $C_{st2}$ of the first storage capacitor $C_{st}$, the first electrode $C_{el}$ of the second storage capacitor $C_{el}$, and the drain of the second reset transistor T3, and the gate of the driving transistor T4 is electrically connected to the drain of the switch transistor T1, the first electrode $C_{st1}$ of the first storage capacitor $C_{st}$, and the drain of the first reset transistor T2. Specifically, the driving transistor T4 is configured to supply a driving current to the first electrode (i.e., anode) of the light emitting device EL during the driving transistor T4 being turned on, and drive the light emitting device EL to emit light.

The source of the light emission control transistor T5 is electrically connected to the first power signal line Vcc, the drain of the light emission control transistor T5 is electrically connected to the source of the driving transistor T4, and a gate of the light emission control transistor T5 is electrically connected to a first control line S1. Specifically, the light emission control transistor T5 is configured to transmit a first power voltage input from the first power signal line Vcc to the source of the driving transistor T4 during the light emission control transistor T5 being turned on.

The first electrode (i.e., anode) of the light emitting device EL is electrically connected to the drain of the driving transistor T4, the second electrode $C_{st2}$ of the first storage capacitor $C_{st}$ and the first electrode $C_{el1}$ of the second storage capacitor $C_{el}$, and a second electrode (i.e., cathode) of the light emitting device EL is electrically connected to the second electrode $C_{el2}$ of the second storage capacitor $C_{el}$ and the second power signal line Vcath.

The first power signal line Vcc serving as a voltage source outputs a constant first power voltage, and the first power voltage is a positive voltage; and the second power signal line Vcath may also serve as a voltage source to output a constant second power voltage, the second power voltage is a negative voltage, or the like. For example, the second power signal line Vcath is grounded.

Figure 3:
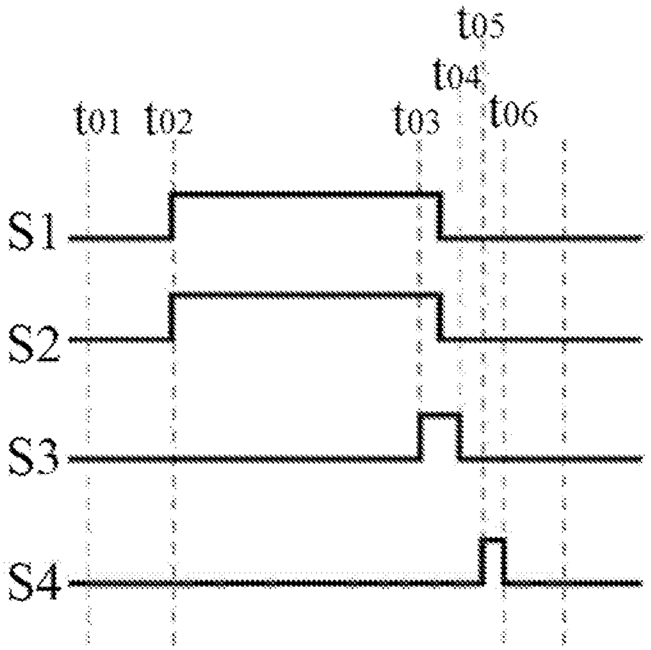
FIG. 3 is a driving timing diagram of the pixel driving circuit of FIG. 2.

FIG. 3 is a driving timing diagram of the pixel driving circuit of FIG. 2, and in FIG. 3, S1 denotes a first control line of the light emission control transistor T5, S2 denotes a second control line of the second reset transistor T3, S3 denotes a third control line of the first reset transistor T2, and S4 denotes a fourth control line of the switch transistor T1.

In the driving timing shown in FIG. 3, during a time duration from t01 to t02, S1, S2, S3 and S3 are all at a low level, and in this case, the light emission control transistor T5 in the pixel driving circuit receives the first power voltage provided by the first power signal line Vcc. During a time duration from t02 to t03, S1 and S2 are at a high level, S3 and S4 are at a low level, the second reset transistor T3 in the pixel driving circuit receives a second reset signal written by the initialization signal line Vinit, and the connection node N2 is at a voltage of Vinit. During a time duration from t03 to t04, S1, S2 and S3 are at a high level, S4 is at a low level, the first reset transistor T2 receives a first reset signal written by the reference signal line Vref, and the connection node N1 is at a voltage of Vref; and in this case, the first reset transistor T2 in the pixel driving circuit continues to receive the first reset signal written by the reference signal line Vref, and the connection node N1 continues to be at the voltage of Vref. During a time duration from t04 to t05, S1, S2, S3 and S4 are all at a low level, and in this case, the light emission control transistor T5 in the pixel driving circuit receives the first power voltage provided by the first power signal line Vcc. During a time duration from t05 to t06, S1, S2 and S3 are at a low level, and S4 is at a high level, and in this case, the switch transistor T1 in the pixel driving circuit makes the driving transistor T4 and the data line Data be conducted to each other, i.e., a current is allowed between the driving transistor T4 and the data line Data, the switch transistor T1 receives a data voltage signal written by the data line Data, and transmits the data voltage signal to the gate of the driving transistor T4; moreover, the driving transistor T4 is turned on under a control of a data signal stored in the storage capacitor $C_{st}$, so that the gate and the drain of the driving transistor T4 are shorted, the driving transistor T4 is in a self-saturation state, and in this case, the data signal and a threshold voltage of the driving transistor T4 are written into the first node N1, thereby realizing a compensation for the threshold voltage of the driving transistor T4; the light emission control transistor T5 in the pixel driving circuit receives the first power voltage supplied from the first power signal line Vcc and supplies a driving current to the driving transistor T4, and the driving transistor T4 controls the driving current flowing from the first power signal line Vcc to the light emitting device EL according to a voltage stored in the storage capacitor $C_{st}$.

Figure 4:
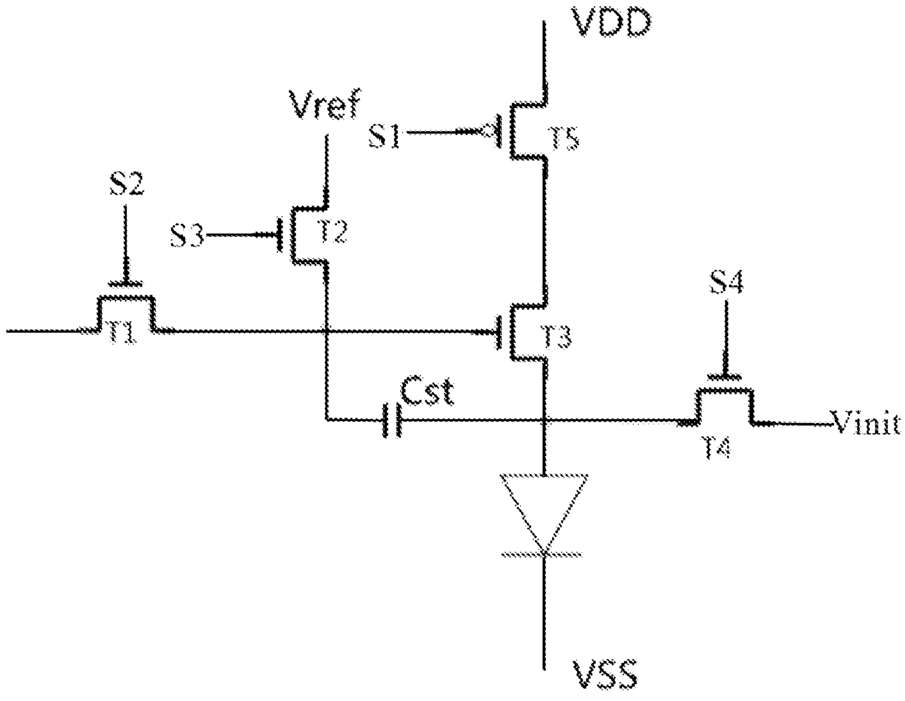
FIG. 4 illustrates another pixel driving circuit according to the present disclosure.
Figure 5:
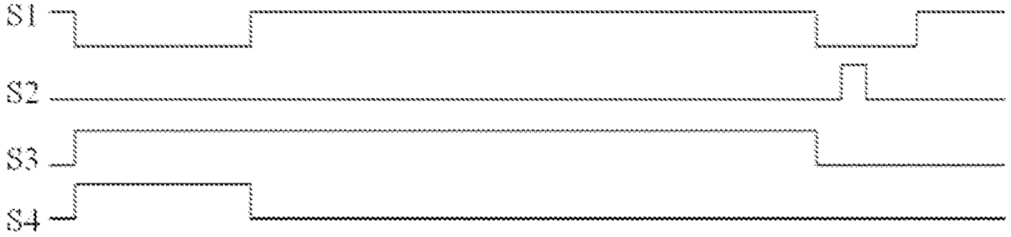
FIG. 5 is a driving timing diagram of the pixel driving circuit of FIG. 4.

FIG. 4 is another pixel driving circuit according to the present disclosure, and FIG. 5 is a driving timing diagram of the pixel driving circuit of FIG. 4; as shown in FIGS. 4 and 5, the pixel driving circuit is realized by a 5T1C (five transistors and one capacitor) structure. It should be noted that the pixel driving circuit shown in FIG. 4 is a modification of the pixel driving circuit shown in FIG. 2, and the light emitting principle of the pixel driving circuit shown in FIG. 4 is similar to that of the pixel driving circuit shown in FIG. 2, and thus is not repeated herein.

Since four gate driving signals are desired by each of above two pixel driving circuits, and the timing corresponding to each pixel driving circuit can be realized in the present disclosure, for convenience of description, the pixel driving circuit and the corresponding timing shown in FIGS. 2 and 3 are taken as examples in the present disclosure, and the following description is made with reference to specific examples.

Figure 7A:
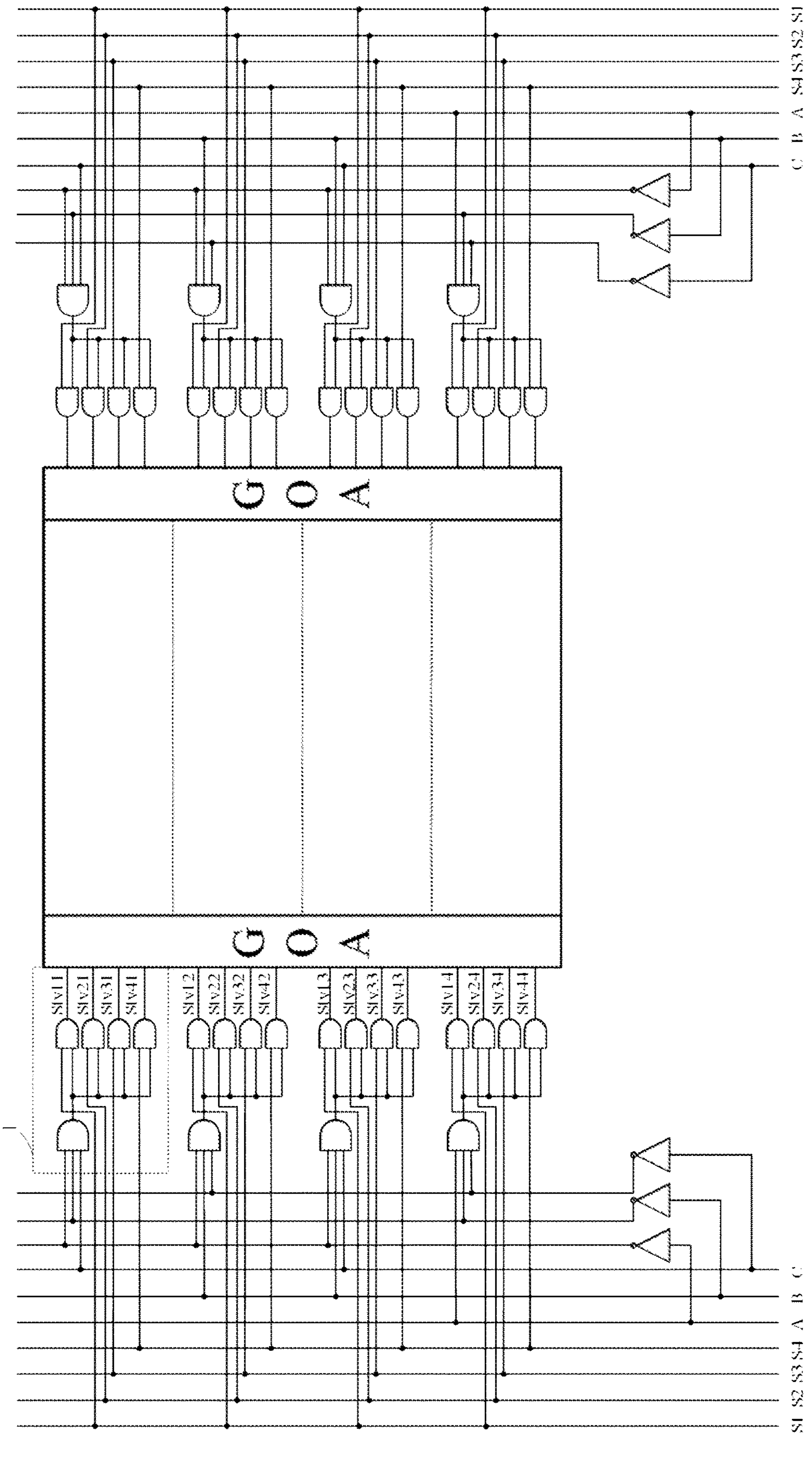
FIG. 7*a* is a schematic diagram of a display panel divided into four regions according to the present disclosure.
Figure 7B:
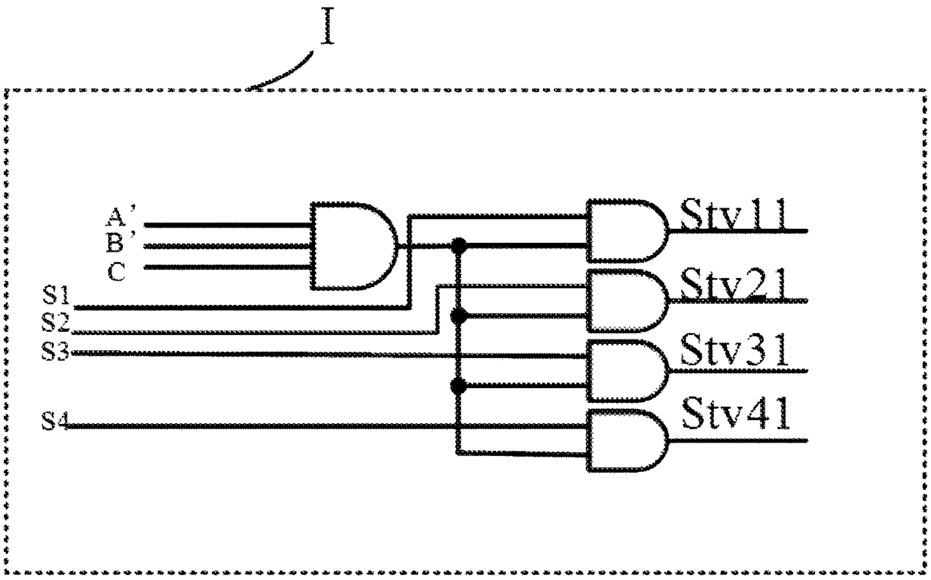
FIG. 7*b* is an enlarged view of part I of FIG. 7*a*.
Figure 8:
FIG. 8 is a driving timing diagram of a signal selection circuit in the display panel of FIG. 7*a*.
Figure 9:
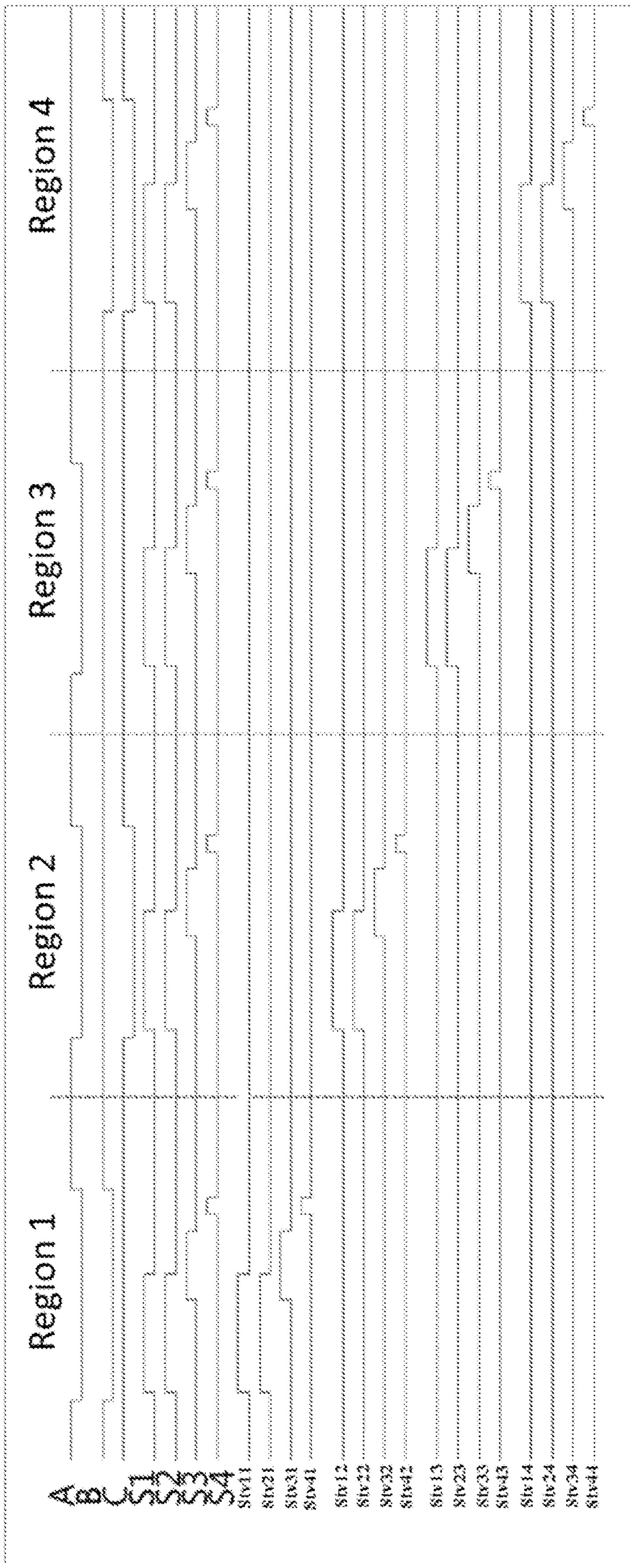
FIG. 9 is a driving timing diagram of a signal selection circuit and a timing diagram of a frame start signal in the display panel of FIG. 7*a*.

As a first example, FIG. 7*a* is a schematic diagram of a display panel divided into four regions according to the present disclosure, FIG. 7*b* is an enlarged view of part I in FIG. 7*a*, FIG. 8 is a driving timing diagram of a signal selection circuit in the display panel of FIG. 7*a*, and FIG. 9 is a driving timing diagram of a signal selection circuit and a timing diagram of a frame start signal in the display panel of FIG. 7*a*; where A', B', and C' are inverted signals of A, B, and C, as shown in FIGS. 7*a*, 7*b*, 8, and 9, in the signal selection circuit of the display panel, M=4, N=4, and P=3, four regions of the display panel are sequentially arranged from a first region to a fourth region and correspond to four selection components one to one, the four selection components include a first selection component, a second selection component, a third selection component, and a fourth selection component; the number of the selection control signal lines is 3, and the selection control signal lines include a first selection control signal line A, a second selection control signal line B and a third selection control signal line C; four frame start signal lines respectively correspond to gate driving circuits for control signals in the pixel driving circuit, and include a first frame start signal line S1, a second frame start signal line S2, a third frame start signal line S3, and a fourth frame start signal line S4; referring to FIG. 3, the first frame start signal line S1, the second frame start signal line S2, the third frame start signal line S3 and the fourth frame start signal line S4 correspond to the first control line S1, the second control line S2, the third control line S3 and the fourth control line S4 of the pixel driving circuit, respectively.

All three first logic devices in the control component are NOT gates and include a first NOT gate, a second NOT gate and a third NOT gate; and four second logic devices in the control component are all 3-input AND gates and include a first AND gate, a second AND gate, a third AND gate and a fourth AND gate, each selection component includes four third logic devices, and the third logic devices are all AND gates, the four third logic devices in the first selection component include a fifth AND gate, a sixth AND gate, a seventh AND gate and an eighth AND gate.

Specifically, in the first selection component, an output terminal of the first AND gate is connected to second input terminals of the fifth AND gate, the sixth AND gate, the seventh AND gate and the eighth AND gate, the first frame start signal line S1 is connected to a first input terminal of the fifth AND gate, the second frame start signal line S2 is connected to a first input terminal of the sixth AND gate, the third frame start signal line S3 is connected to a first input terminal of the seventh AND gate, and the fourth frame start signal line S4 is connected to a first input terminal of the eighth AND gate. Connections of each selection component are the same as those described above.

Level signals are input into the frame start signal lines and the selection control signal lines according to an implementation sequence, where a first input terminal of the first AND gate is connected with an output terminal of the first NOT gate, a second input terminal of the first AND gate is connected with an output terminal of the second NOT gate, a third input terminal of the first AND gate is connected with the third selection control signal line C, and in this case, the output terminal of the first AND gate outputs a high level signal, and the first frame start signal line S1 outputs a high level signal; the first input terminal of the fifth AND gate is connected with the first frame start signal line S1, a second input terminal of the fifth AND gate is connected with the output terminal of the first AND gate, and in this case, an output terminal of the fifth AND gate outputs a high level signal, the rest can be deduced from above, and the frame start signals are respectively provided for the four regions of the display panel.

Figure 10:
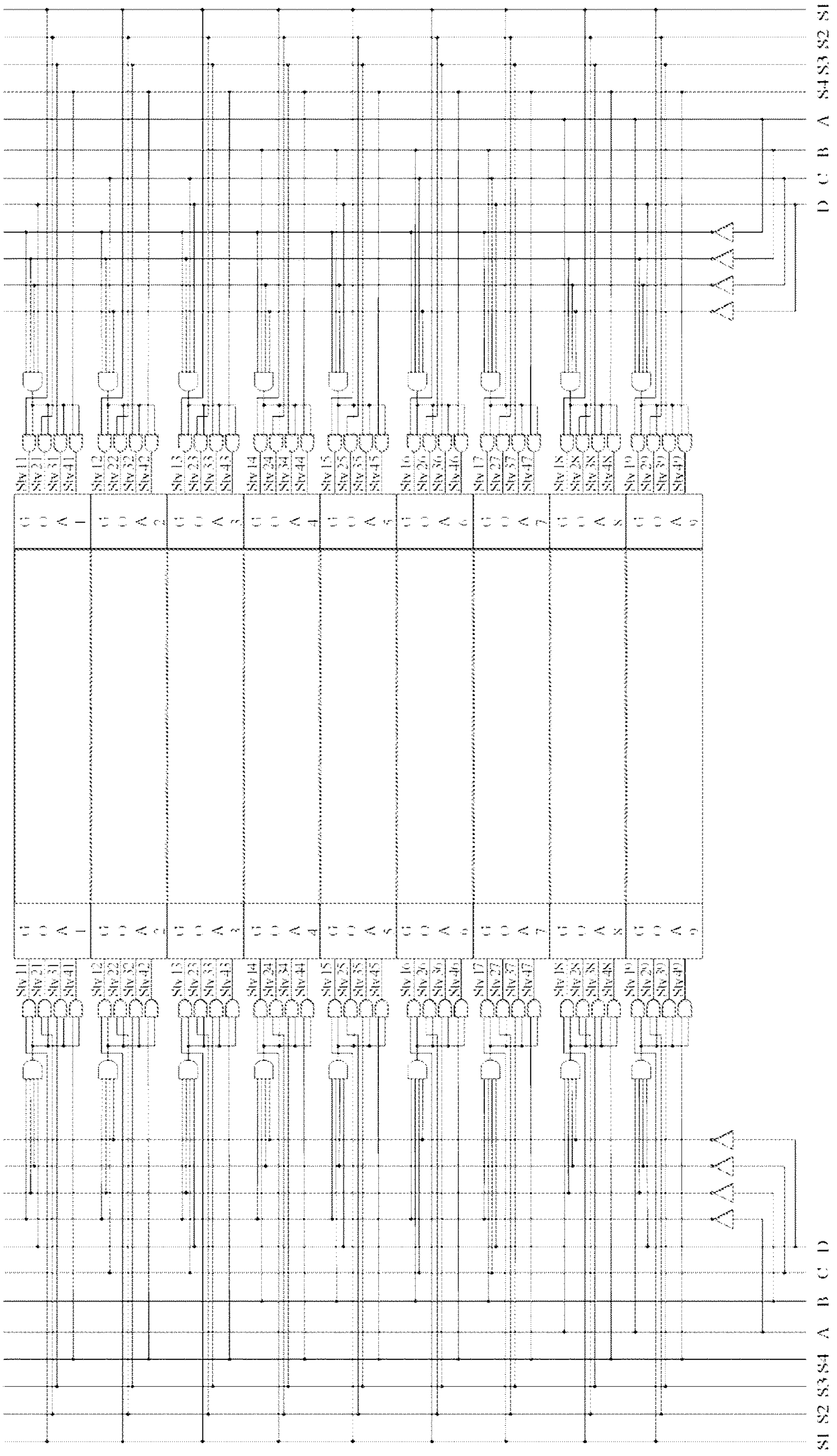
FIG. 10 is a schematic diagram of a display panel divided into nine regions according to the present disclosure.
Figure 11:
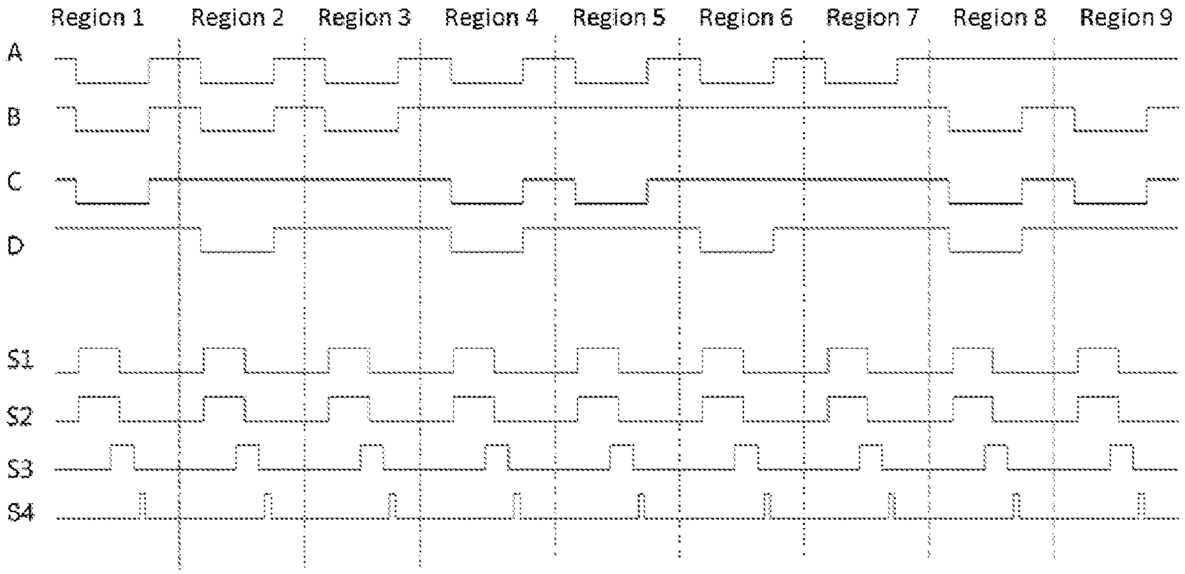
FIG. 11 is a driving timing diagram of a signal selection circuit in the display panel of FIG. 10.

As a second example, FIG. 10 is a schematic diagram of a display panel divided into nine regions according to the present disclosure, and FIG. 11 is a driving timing diagram of a signal selection circuit in the display panel of FIG. 10; as shown in FIGS. 10 and 11, in the signal selection circuit of the display panel, M=4, N=9, P=4, nine regions of the display panel are sequentially arranged from a first region to a ninth region and correspond to nine selection components one to one, and the selection components include a first selection component, a second selection component, a third selection component, a fourth selection component, a fifth selection component, a sixth selection component, a seventh selection component, an eighth selection component, and a ninth selection component; the number of the selection control signal lines is 4, and the selection control signal lines include a first selection control signal line A, a second selection control signal line B, a third selection control signal line C and a fourth selection control signal line D; four frame start signal lines include a first frame start signal line S1, a second frame start signal line S2, a third frame start signal line S3 and a fourth frame start signal line S4; referring to FIG. 3, the first frame start signal line S1, the second frame start signal line S2, the third frame start signal line S3 and the fourth frame start signal line S4 correspond to the first control line S1, the second control line S2, the third control line S3 and the fourth control line S4 of the pixel driving circuit, respectively.

All four first logic devices in the control component are NOT gates and include a first NOT gate, a second NOT gate, a third NOT gate and a fourth NOT gate; and nine second logic devices in the control component are all 4-input AND gates and include a first AND gate, a second AND gate, a third AND gate, a fourth AND gate, a fifth AND gate, a sixth AND gate, a seventh AND gate, an eighth AND gate and a ninth AND gate, each selection component includes four third logic devices, and the third logic devices are all AND gates, where the four third logic devices in the first selection component include a tenth AND gate, an eleventh AND gate, a twelfth AND gate and a thirteenth AND gate.

Specifically, in the first selection component, an output terminal of the first AND gate is connected to second input terminals of the tenth AND gate, the eleventh AND gate, the twelfth AND gate and the thirteenth AND gate, the first frame start signal line S1 is connected to a first input terminal of the tenth AND gate, the second frame start signal line S2 is connected to a first input terminal of the eleventh AND gate, the third frame start signal line S3 is connected to a first input terminal of the twelfth AND gate, and the fourth frame start signal line S4 is connected to a first input terminal of the thirteenth AND gate. Connections of each selection component are the same as those described above.

Level signals are input into the frame start signal lines and the selection control signal lines according to an implementation sequence, where the first input terminal of the first AND gate is connected with an output terminal of the first NOT gate, the second input terminal of the first AND gate is connected with an output terminal of the second NOT gate, a third input terminal of the first AND gate is connected with an output terminal of the third NOT gate, a fourth input terminal of the first AND gate is connected with a fourth selection control signal line D, and in this case, the output terminal of the first AND gate outputs a high level signal, and the first frame start signal line S1 outputs a high level signal; the first input terminal of the tenth AND gate is connected with the first frame start signal line S1, a second input terminal of the tenth AND gate is connected with the output terminal of the first AND gate, and in this case, an output terminal of the tenth AND gate outputs a high level signal, the rest can be deduced from above, and the frame start signals are respectively provided for the nine regions of the display panel.

Figure 13:
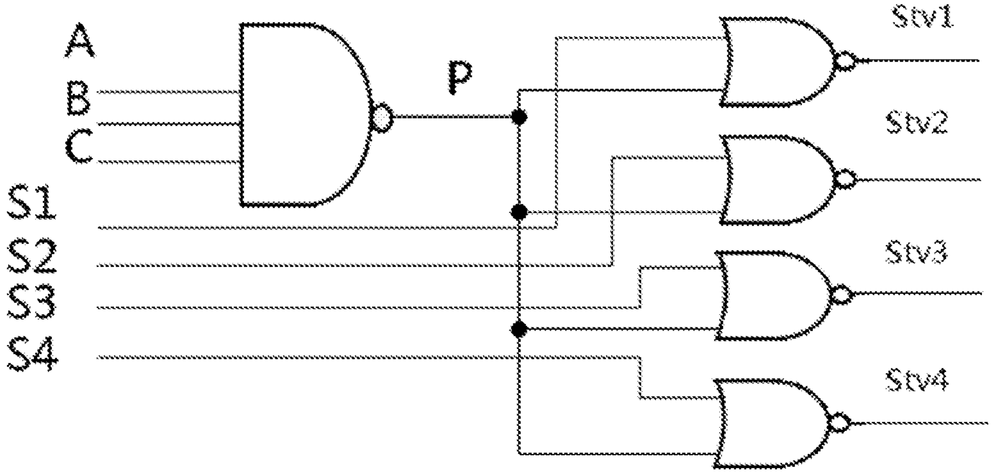
FIG. 13 is a schematic structural diagram of another selection component according to the present disclosure.
Figure 14:
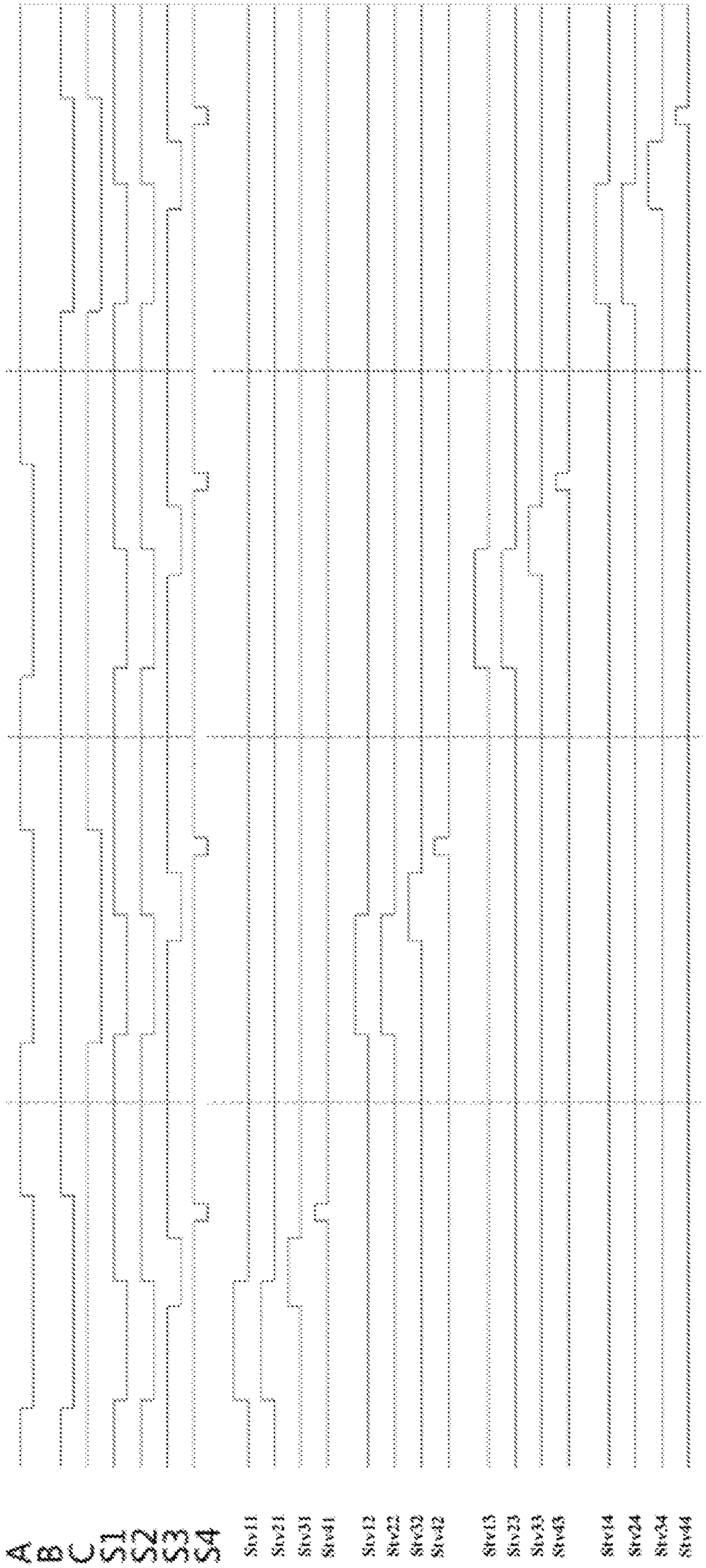
FIG. 14 is a driving timing diagram of a display panel applied with the selection component of FIG. 13 and divided into four region according to the present disclosure.

As a third example, FIG. 13 is a schematic structural diagram of another selection component in the present disclosure, and FIG. 14 is a driving timing diagram of the display panel applied with the selection component of FIG. 13 and divided into four regions in the present disclosure; as shown in FIGS. 13 and 14, in the signal selection circuit of the display panel, M=4, N=4, and P=3, four regions of the display panel are sequentially arranged from a first region to a fourth region and correspond to four selection components one to one, the four selection components include a first selection component, a second selection component, a third selection component, and a fourth selection component; the number of the selection control signal lines is 3, and the selection control signal lines include a first selection control signal line A, a second selection control signal line B and a third selection control signal line C; four frame start signal lines include a first frame start signal line S1, a second frame start signal line S2, a third frame start signal line S3 and a fourth frame start signal line S4; referring to FIG. 3, the first frame start signal line S1, the second frame start signal line S2, the third frame start signal line S3 and the fourth frame start signal line S4 correspond to the first control line S1, the second control line S2, the third control line S3 and the fourth control line S4 of the pixel driving circuit, respectively.

All three first logic devices in the control component are NOT gates and include a first NOT gate, a second NOT gate and a third NOT gate; four second logic devices in the control component are all 3-input NAND gates and include a first NAND gate, a second NAND gate, a third NAND gate and a fourth NAND gate, each selection component includes four third logic devices, and the third logic devices are NOR gates, where the four third logic devices in the first selection component include a fifth NOR gate, a sixth NOR gate, a seventh NOR gate and an eighth NOR gate.

Specifically, in the first selection component, an output terminal of the first NAND gate is connected to second input terminals of the fifth, sixth, seventh and eighth NOR gates, the first frame start signal line S1 is connected to a first input terminal of the fifth NOR gate, the second frame start signal line S2 is connected to a first input terminal of the sixth NOR gate, the third frame start signal line S3 is connected to a first input terminal of the seventh NOR gate, and the fourth frame start signal line S4 is connected to a first input terminal of the eighth NOR gate. Connections of each selection component are the same as those described above.

Level signals are input into the frame start signal lines and the selection control signal lines according to an implementation sequence, where a first input terminal of the first NAND gate is connected with an output terminal of the first NOT gate, a second input terminal of the first NAND gate is connected with an output terminal of the second NOT gate, a third input terminal of the first NAND gate is connected with the third selection control signal line C, and in this case, the output terminal of the first NAND gate outputs a low level signal, and the first frame start signal line S1 outputs a low level signal; a first input terminal of the fifth AND gate is connected with the first frame start signal line S1, a second input terminal of the fifth AND gate is connected with the output terminal of the first AND gate, and in this case, an output terminal of the fifth AND gate outputs a high level signal, the rest can be deduced from above, and the frame start signals are respectively provided for the four regions of the display panel.

It should be noted that, in the present disclosure, since the NAND gate in the CMOS gate circuit is easier to be implemented than the AND gate, the second logic device is changed into the NAND gate to simplify the internal basic circuit of the present disclosure, thereby optimizing the architecture of the present disclosure and reducing the manufacturing cost.

The present disclosure further provides a signal selection method of a display panel, applied to the signal selection circuit of the display panel described above, including: determining a number N of divided regions of the display panel and a number M of frame start signal lines; inputting M frame start signals into the M frame start signal lines, and outputting M×N frame start signals according to a preset sequence through a selection sub-circuit so as to realize displaying of the display panel region by region.

The present disclosure further provides a display device, including the signal selection circuit of the display panel described above.

In some examples, both ends of gate lines of the pixel driving circuit in the display panel of the display device are connected with gate driving circuits respectively, that is, for each gate line, there is one GOA component at each of opposite ends (left and right ends) to charge the gate line, and in such case, left and right GOA components are symmetrically designed, and the gate line is driven bilaterally. In such display panel, the signal selection circuit of the present disclosure is bilaterally arranged in regions of the display panel according to the GOA components, that is, each side of the display panel is provided with the signal selection circuit.

It should be noted that, for a small-sized display panel, since a load of each gate line is relatively small, one GOA component may be provided only at a single end of each gate line, that is, the gate line is driven unilaterally. Similar, in such display panel, the signal selection circuit of the present disclosure is arranged unilaterally in the regions of the display panel according to the GOA component, that is, the signal selection circuit is provided on a single side of the display panel.

It will be understood that the above implementations are merely exemplary implementations adopted to illustrate principles of the present disclosure, and the present disclosure is not limited thereto. It will be apparent to those skilled in the art that various modifications and improvements may be made without departing from the spirit and scope of the present disclosure, and such modifications and improvements are also considered to be within the scope of the present disclosure.

The invention claimed is:

1. A signal selection circuit of a display panel, the display panel being divided into N regions, and comprising a plurality of pixel driving circuits, and M gate driving circuits for providing M gate driving signals to the pixel driving circuits, each of the gate driving circuits comprising N gate driving sub-circuits, and each of the gate driving sub-circuits being configured to provide one of the gate driving signals to the pixel driving circuits in one region, M≥2, N≥2, and M and N being integers, the signal selection circuit comprising:

M frame start signal lines, each frame start signal line being configured to provide a frame start signal for one of the gate driving circuits; and a selection sub-circuit configured to output frame start signals written by the frame start signal lines to the gate driving sub-circuits corresponding to the regions of the display panel according to a preset sequence, wherein the selection sub-circuit comprises: a control component and N selection components;

the control component is configured to select one of the N selection components to operate;

the N selection components are arranged in one-to-one correspondence with the N regions of the display panel, and each selection component is configured to provide frame start signals for the M gate driving circuits corresponding to one region under a control of the control component, wherein the control component further comprises P first logic devices and N second logic devices; each of the selection components comprises M third logic devices; the first logic devices are NOT gates, and the second logic devices and the third logic devices are AND gates; $P=[\log_2 N]+1$;

an input terminal of each first logic device is connected with a corresponding selection control signal line, and each selection control signal line and an output terminal of each first logic device are connected with an input terminal of a corresponding one of the second logic devices, so that output terminals of the N second logic devices output selection control signals according to a preset sequence to control the corresponding selection components to operate;

each third logic device in each selection component is connected with the frame start signal line corresponding to the third logic device and an output terminal of the second logic device corresponding to the third logic device.

2. The signal selection circuit according to claim 1, wherein the N second logic devices are AND gates, and a number X of input bits of each AND gate is the same as a number P of selection control signal lines.

3. The signal selection circuit according to claim 2, wherein M=4, N=4, and P=3, four regions of the display panel are sequentially arranged from a first region to a fourth region and correspond to four selection components one to one, the four selection components comprise a first selection component, a second selection component, a third selection component, and a fourth selection component; the number of the selection control signal lines is 3, and the selection control signal lines comprise a first selection control signal line, a second selection control signal line and a third selection control signal line; four frame start signal lines comprise a first frame start signal line, a second frame start signal line, a third frame start signal line and a fourth frame start signal line, all three first logic devices in the control component are NOT gates and comprise a first NOT gate, a second NOT gate and a third NOT gate; all four second logic devices in the control component are 3-input AND gates, and comprise a first AND gate, a second AND gate, a third AND gate and a fourth AND gate, each of the selection components comprises four third logic devices, the third logic devices are all AND gates, and the four third logic devices in the first selection component comprise a fifth AND gate, a sixth AND gate, a seventh AND gate and an eighth AND gate;

level signals are input into the frame start signal lines and the selection control signal lines according to an implementation sequence, wherein a first input terminal of the first AND gate is connected with an output terminal of the first NOT gate, a second input terminal of the first AND gate is connected with an output terminal of the second NOT gate, a third input terminal of the first AND gate is connected with the third selection control signal line, an output terminal of the first AND gate outputs a high level signal, and the first frame start signal line outputs a high level signal; a first input terminal of the fifth AND gate is connected with the first frame start signal line, a second input terminal of the fifth AND gate is connected with the output terminal of the first AND gate, an output terminal of the fifth AND gate outputs a high level signal, in such way, frame start signals are respectively provided for the four regions of the display panel.

4. A signal selection method of a display panel, applied to the signal selection circuit of the display panel according to claim 1, comprising:

determining a number N of divided regions of the display panel and a number M of frame start signal lines;

inputting M frame start signals into the M frame start signal lines, and outputting M×N frame start signals according to a preset sequence through the selection sub-circuit to realize displaying of the display panel region by region.

5. A display device, comprising the signal selection circuit of the display panel according to claim 1.

6. The display device according to claim 5, further comprising gate lines for supplying gate driving signals to the pixel driving circuits, opposite ends of each of the gate lines are connected with the gate driving circuits respectively, and each of the gate driving circuits is electrically connected to the signal selection circuit of the display panel.

7. A signal selection circuit of a display panel, the display panel being divided into N regions, and comprising a plurality of pixel driving circuits, and M gate driving circuits for providing M gate driving signals to the pixel driving circuits, each of the gate driving circuits comprising N gate driving sub-circuits, and each of the gate driving sub-circuits being configured to provide one of the gate driving signals to the pixel driving circuits in one region, M≥2, N≥2, and M and N being integers, the signal selection circuit comprising:

M frame start signal lines, each frame start signal line being configured to provide a frame start signal for one of the gate driving circuits; and a selection sub-circuit configured to output frame start signals written by the frame start signal lines to the gate driving sub-circuits corresponding to the regions of the display panel according to a preset sequence, wherein the selection sub-circuit comprises: a control component and N selection components;

the control component is configured to select one of the N selection components to operate;

the N selection components are arranged in one-to-one correspondence with the N regions of the display panel, and each selection component is configured to provide frame start signals for the M gate driving circuits corresponding to one region under a control of the control component, wherein the control component further comprises P first logic devices and N second logic devices; each of the selection components comprises M third logic devices; the first logic devices are NOT gates, the second logic devices are NAND gates, and the third logic devices are NOR gates; $P=[\log_2 N]+1$;

an input terminal of each first logic device is connected with a corresponding selection control signal line, and each selection control signal line and an output terminal of each first logic device are connected with an input terminal of a corresponding one of the second logic devices, so that output terminals of the N second logic devices output selection control signals according to a preset sequence to control the selection components correspondingly to operate;

each third logic device in each selection component is connected with the frame start signal line corresponding to the third logic device and an output terminal of the second logic device corresponding to the third logic device.

8. The signal selection circuit according to claim 7, wherein the N second logic devices are NAND gates, and a number X of input bits of each NAND gate is the same as a number P of selection control signal lines.

9. A signal selection method of a display panel, applied to the signal selection circuit of the display panel according to claim 7, comprising:

determining a number N of divided regions of the display panel and a number M of frame start signal lines;

inputting M frame start signals into the M frame start signal lines, and outputting M×N frame start signals according to a preset sequence through the selection sub-circuit to realize displaying of the display panel region by region.

10. A display device, comprising the signal selection circuit of the display panel according to claim 7.

11. The display device according to claim 10, further comprising gate lines for supplying gate driving signals to the pixel driving circuits, opposite ends of each of the gate lines are connected with the gate driving circuits respectively, and each of the gate driving circuits is electrically connected to the signal selection circuit of the display panel.

* * * * *